United States Patent
Avgustinov (10) Patent No.: US 10,768,925 B2
(45) Date of Patent: Sep. 8, 2020

(54) PERFORMING PARTIAL ANALYSIS OF A SOURCE CODE BASE

(71) Applicant: MICROSOFT TECHNOLOGY LICENSING, LLC, Redmond, WA (US)

(72) Inventor: Pavel Avgustinov, Oxford (GB)

(*) Notice: Subject to any disclaimer, the term of this patent is extended or adjusted under 35 U.S.C. 154(b) by 925 days.

(21) Appl. No.: 14/727,675

(22) Filed: Jun. 1, 2015

(65) Prior Publication Data

US 2020/0225935 A1    Jul. 16, 2020

(51) Int. Cl.
  *G06F 8/70*    (2018.01)
  *G06F 16/14*   (2019.01)
  *G06F 11/36*   (2006.01)

(52) U.S. Cl.
  CPC ............. *G06F 8/70* (2013.01); *G06F 16/148* (2019.01); *G06F 11/362* (2013.01); *G06F 11/3604* (2013.01)

(58) Field of Classification Search
  CPC .......... G06F 8/75; G06F 8/70; G06F 11/3664; G06F 16/148
  See application file for complete search history.

(56) References Cited

U.S. PATENT DOCUMENTS

| | | | | |
|---|---|---|---|---|
| 7,237,235 B2 * | 6/2007 | Maeda | ..................... | G06F 8/61 709/203 |
| 8,806,450 B1 * | 8/2014 | Maharana | ........... | G06F 11/3608 717/133 |
| 10,122,749 B2 * | 11/2018 | Li | ............................ | G06F 8/75 |
| 2006/0161904 A1 * | 7/2006 | Farchi | ................. | G06F 11/3696 717/135 |
| 2007/0294667 A1 * | 12/2007 | Caceres | .................... | G06F 8/36 717/120 |
| 2008/0104570 A1 * | 5/2008 | Chedgey | .................. | G06F 8/75 717/105 |
| 2008/0196012 A1 * | 8/2008 | Cohen | ...................... | G06F 8/75 717/125 |

(Continued)

OTHER PUBLICATIONS

"enabling static analysis for partial java programs"; "Laurie et al"; "Oct. 2008"; "16 pages".*

(Continued)

*Primary Examiner* — Wei Y Zhen
*Assistant Examiner* — Brahim Bourzik
(74) *Attorney, Agent, or Firm* — Workman Nydegger (57) ABSTRACT

Methods, systems, and apparatus, including computer programs encoded on computer storage media, for performing partial analysis of source code files in a code base. One of the methods includes receiving a request for analysis results for a subset of source code files in a project. A set of primary source code files is generated according to the request, wherein the set of primary source code files includes fewer than all source code files in the project. A set of secondary source code files is generated, the set comprising source code files upon which at least one of the primary source code files depends directly or transitively. A partial analysis of the code base is performed using all files included in the set of primary source code files or the set of secondary source code files. Analysis results for the files included in the set of primary source code files is provided in response to the request.

29 Claims, 4 Drawing Sheets

(56) References Cited

U.S. PATENT DOCUMENTS

| | | | | |
|---|---|---|---|---|
| 2009/0307664 | A1* | 12/2009 | Huuck | G06F 11/3608 |
| | | | | 717/124 |
| 2012/0304153 | A1* | 11/2012 | Li | G06F 8/75 |
| | | | | 717/123 |
| 2013/0055221 | A1* | 2/2013 | Murthy | G06F 11/3608 |
| | | | | 717/132 |
| 2013/0081002 | A1* | 3/2013 | Kalman | G06F 11/3604 |
| | | | | 717/132 |
| 2014/0130020 | A1* | 5/2014 | Boshernitsan | G06F 11/3688 |
| | | | | 717/131 |
| 2015/0007140 | A1* | 1/2015 | Boshernitsan | G06F 11/368 |
| | | | | 717/124 |

OTHER PUBLICATIONS

"William et al";"Using static analysis to find bugs";"Oct. 2008"; "8 pages".*

"Thomas et al"; "Predicting Defects using Network Analysis on Dependency Graphs";"10 pages";"2008".*

Delev et al ;"Static analysis of source code written by novice programmers"; "7 pages" (Year: 2017).*

'http://findbugs.sourceforge.net' [online]. "Chapter 4: Running FindBugs," Mar. 2015 [retrieved on Feb. 18, 2016]. Retrieved from the Internet at URL: http://findbugs.sourceforge.net/manual/running.html, 6 pages.

'http://findbugs.sourceforge.net' [online]. "Chapter 5: Using the FindBugs GUI," Mar. 2015 [retrieved on Feb. 18, 2016]. Retrieved from the Internet at URL: http://findbugs.sourceforge.net/manual/gui.html, 3 pages.

'http://findbugs.sourceforge.net' [online]. "Chapter 6: Using the FindBugs Ant task," Mar. 2015 [retrieved on Feb. 18, 2016]. Retrieved from the Internet at URL: http://findbugs.sourceforge.net/manual/anttask.html, 5 pages.

http://findbugs.sourceforge.net' [online]. "Chapter 7: Using the FindBugs Eclipse Plugin," Mar. 2015 [retrieved on Feb. 18, 2016]. Retrieved from the Internet at URL: http://findbugs.sourceforge.net/manual/eclipse.html, 3 pages.

http://findbugs.sourceforge.net' [online]. "Chapter 8: Filter Files," Mar. 2015 [retrieved on Feb. 18, 2016]. Retrieved from the Internet at URL: http://findbugs.sourceforge.net/manual/filter.html, 7 pages.

http://findbugs.sourceforge.net' [online]. "Chapter 9: Analysis Properties," Mar. 2015 [retrieved on Feb. 18, 2016]. Retrieved from the Internet at URL: http://findbugs.sourceforge.net/manual/analysisprops.html, 2 pages.

http://findbugs.sourceforge.net' [online]. "Chapter 10: Annotations," Mar. 2015 [retrieved on Feb. 18, 2016]. Retrieved from the Internet at URL: http://findbugs.sourceforge.net/manual/annotations.html, 4 pages.

http://findbugs.sourceforge.net' [online]. "Chapter 11: Using rejarFor analysis," Mar. 2015 [retrieved on Feb. 18, 2016]. Retrieved from the Internet at URL: http://findbugs.sourceforge.net/manual/rejarForAnalysis.html, 1 page.

http://findbugs.sourceforge.net' [online]. "Chapter 12: Data mining of bugs with FindBugs," Mar. 2015 [retrieved on Feb. 18, 2016]. Retrieved from the Internet at URL: http://findbugs.sourceforge.net/manual/datamining.html, 9 pages.

* cited by examiner

PERFORMING PARTIAL ANALYSIS OF A SOURCE CODE BASE

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot is a view of the source code of files of the code base as the files existed at a particular point in time.

SUMMARY

This specification describes how a static analysis system can perform a partial analysis of a project code base using a set of primary source code files, a set of secondary source code files, and a dependency graph of the project.

Particular embodiments of the subject matter described in this specification can be implemented so as to realize one or more of the following advantages. A system can provide users with faster static analysis results, which makes static analysis systems more interactive and more responsive. The system does not need analyze all of the source code files in a project to provide static analysis results that pertain to a particular portion of the project, resulting in fewer computing resources being used on static analysis. The system can be integrated with various coding tools and the responsiveness of such tools can be improved. Static analysis results can be tailored to particular coding tools, programming languages, and user preferences. By making the static analysis more interactive and responsive, static analysis can be made a standard part of the code development and code review processes. The ability to perform partial analysis may be used to provide a developer with the capability to obtain focused analysis of only the parts of a code base for which the developer is responsible or allowed to edit. The system can provide more accurate analysis results by calculating a set of secondary source code files that will be used to generate the analysis results. Treating automatically generated code as secondary allows the system to automatically suppress voluminous and uninteresting analysis results of automatically generated source code.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies for performing partial static analysis of source code in a code base. Generating static analysis results for all source code files in a project, which will be referred to as performing a full analysis, can be time consuming, particularly if the project is large. Moreover, users may only be interested in results pertaining to a portion of the project, e.g., files under development, files under review, or files that have changed between revisions. Generating static analysis results for a portion of the source code files in a project, which will be referred to as performing a partial analysis, can produce results that are highly accurate and relevant for source code files that users are most interested in and in only a fraction of the time required to perform a full analysis.

Figure 1:
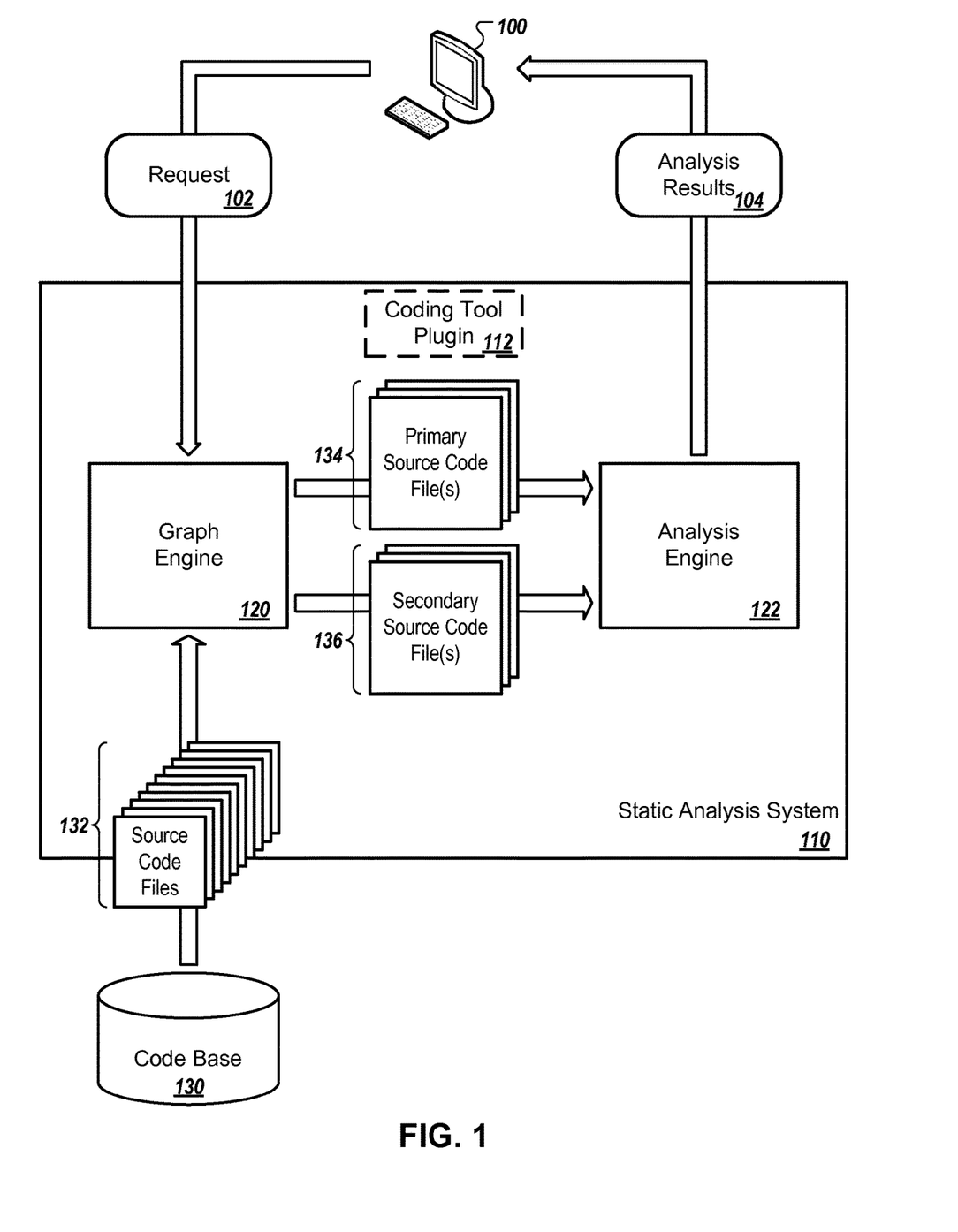
FIG. 1 illustrates an example system.

FIG. 1 illustrates an example system. A user device 100 can provide, to a static analysis system 110, a request 102 for static analysis results 104. The static analysis system 110 can be installed on the user device 100, for example, or can be installed on one or more servers in communication with the user device 100 over a communication network. In general, the request 102 may pertain to a subset of project source code files in a code base 130. The system 110 can perform a partial analysis of the project source code files to generate analysis results 104 and can provide the corresponding analysis results 104 to the user device 100. The system 110 can typically perform a partial analysis of a subset of the project in less time than a full analysis of all the source code files in the project.

The analysis results 104 can include characteristic segments of extracted source code identified by the analysis engine 122. A characteristic segment of source code is a segment of source code having a particular attribute. The analysis results 104 can include data specifying where, in the project, the characteristic segments of source code occur.

An example of characteristic segments of source code that the static analysis system 110 can generate is source code coding defects. Coding defects are segments of source code that violate one or more coding standards or rules. Data representing such coding defects will be referred to as violations. Thus, a violation can identify a location in a source code file of a coding defect, a type of or message for the coding defect, and the segment of source code that causes the coding defect. For example, a segment of source code that compares variables of incomparable types is a coding defect, which can be represented by a corresponding violation that identifies the location of the source code, the source code itself, and a type of "comparison between variables of incomparable types." For simplicity, the examples below may refer to identifying characteristic source code segments that are source code violations. However, the same techniques can be applied for other static analysis results that identify other characteristics, properties, or attributes of source code of a project. For example, the analysis results 104 can include a call graph of source code in a project.

The static analysis system 110 includes several different functional components, including a graph engine 120 and an analysis engine 122. The various software applications of the static analysis system 110 may be installed on one or more computers as separate software applications or as different modules of a same software application.

The static analysis system 110 may also include a coding tool plugin 112. The coding tool plugin 112 is a software application or module that extends the capabilities of other coding tools by allowing the analysis results 104 generated by the static analysis system 110 to be integrated into the other coding tools. The implementation of the coding tool plugin 112 will depend on the particular coding tool being extended. For simplicity, only one coding tool plugin 112 is shown. However, the system 110 may include multiple coding tool plugins to support a variety of applications.

Coding tools generally facilitate selection, by a user, of a subset of source code files in the code base whose analysis results should be presented. These files will be referred to as primary files. For some applications, it may be appropriate for the system 110 to supplement a set of primary files with additional primary files. Alternatively, the primary files may be selected manually by a user without the use of a coding tool.

In addition to the primary files, the static analysis system 110 will generally also automatically obtain additional source code files in the code base 130 when performing the partial analysis, e.g., files upon which the primary files depend. These files will be referred to as secondary files. In general, secondary files are source code files that are not themselves primary files but which the static analysis system 110 selects in order to obtain higher-quality results for the partial analysis. This will be described in more detail below.

A first example of a coding tool that can make use of the coding tool plugin 112 is an integrated development environment (IDE). An IDE is an application, or a suite of applications, that facilitates developing source code on a single user device through a graphical user interface. An IDE usually has applications including a source code editor, a compiler, and a debugger. IDEs often also have a file browser as well as object and class browsers.

IDEs are designed to be interactive and responsive. Thus, performing a full analysis of all source code files in the code base 130 is generally too time-consuming for IDE applications. Thus, an IDE can use the coding tool plugin 112 to present results of a partial analysis of source code in the code base within the development environment. For example, a user can request static analysis results 104 by selecting an option, e.g., a button, from within the IDE. The coding tool plugin 112 can then automatically select source code files that are currently being displayed to the user in the IDE as the primary files whose analysis results 104 should be displayed. The IDE can then display the resulting analysis results 104 within the IDE.

A second example of a coding tool that can make use of the coding tool plugin 112 is a code review tool. A code review tool is any appropriate software application, or suite of software applications, that developers can use to facilitate review of source code files that are the subject of previous or proposed commits or changes to the source code base.

Performing static analysis on all source code files in the code base 130 is time consuming and most of the results would not be relevant to the source code files under review. Thus, a code review tool can use the coding tool plugin 112 to perform partial analysis of the source code that is part of a code review. For example, a user can select, within a code review tool, a number of source code files that are part of a proposed commit to the source code base. The coding tool plugin 112 can then automatically select the source code files that are the subject of the code review as the primary files whose analysis results 104 should be presented as part of the code review tool. The coding tool plugin 112 can then provide the resulting analysis results 104 to the code review tool for presentation to the user.

A third example of a coding tool that can make use of the coding tool plugin 112 is a historical analysis tool. A historical analysis tool is any appropriate software application that can be used to analyze relationships between previous snapshots of the code base.

An example historical analysis tool identifies violations in snapshots of the code base 110 and matches violations occurring in adjacent snapshots according to a revision graph. Violations that are unmatched between adjacent snapshots in the revision graph can be attributed to responsible entities. For example, a violation that occurred in a first snapshot but was not matched to any violations in a subsequent snapshot is a violation that was fixed by an entity responsible for committing the subsequent snapshot. Conversely, a violation that occurred in a subsequent snapshot that was not matched to any violations in a previous snapshot is a violation that was introduced by an entity responsible for committing the subsequent snapshot. Example techniques for matching and attributing violations are described in commonly owned U.S. patent application Ser. No. 14/696,185, for "Source Code Violation Matching and Attribution," which is incorporated here by reference.

A common use case for a historical analysis tool is attributing coding defects that were introduced or removed between snapshots in a revision graph. Often, the comparison is between revisions of the code base that are very similar to one another. In this situation, performing a full analysis on all source code files of all the snapshots being compared is potentially wasteful in terms of computational time and resources. A historical analysis tool can use the coding tool plugin 112 to perform partial analysis of primary files in the first snapshot and primary files in the second snapshot, which includes source code files that changed between the snapshots. The coding tool plugin 112 can thus automatically identify the source code files that have changed between the two snapshots as the primary source code files whose analysis results 104 should be presented. The coding tool plugin 112 can then provide the resulting analysis results 104 to the historical analysis tool for presentation to a user. And even though only a partial analysis was performed on the two snapshots, the attribution data will generally be equivalent to the data that would have been generated had a full analysis been performed on both snapshots.

The aforementioned coding tools illustrate three common situations where partial analysis of source code in the case base 110 is beneficial. In addition, other appropriate coding tools can also use a corresponding coding tool plugin 112 to integrate the analysis results 104 generated by the static analysis system 110 for a particular application.

In response to receiving the request 102 for analysis results for a subset of project source files, for example, the static analysis system 110 can generate and provide analysis results 104. To generate the analysis results 104, the static analysis system 110 can access a code base 130 and can extract a collection of source code files 132 from the code base. In general, the code base 130 may include a collection of all source code files used to build a particular software system, application, or component. The code base 130 may be stored in a source control repository included in a revision control system, for example, or may be stored as a set of files. The extracted source code files 132 can be received by the graph engine 120 for analysis.

The graph engine 120 can generate a dependency graph that represents the dependencies of the source code files 132. An example dependency graph is described in more detail below with reference to FIG. 2. Based at least in part on a dependency graph, for example, the graph engine 120 can generate a set of primary source code files 134 and a set of secondary source code files 136.

The set of primary source code files 134 can include files for which analysis results are to be shown. As described above, the set of primary files that is selected is application dependent. For an IDE, for example, an initial approximation of primary source code files may include one or more files displayed by an interface of the IDE. For a code review tool, for example, an initial approximation of primary source code files may include one or more files included in a change list, i.e., files that have been changed and are under review. For a historical analysis tool, for example, an initial approximation of primary source code files may include one or more files that have changed between two different revisions of the code base 130. The initial approximation of primary source code files may be supplemented with additional primary source code files using the dependency graph, for example, based on one or more programming languages used to create the source code files 132, a type of application requesting the analysis results 104, one or more specified parameters, and other suitable factors.

The set of secondary source code files 136 can include files that the primary source code files 134 depend on. The secondary source code files 136, for example, may contribute definitions, modules, and other information relied on by the primary source code files 134, and which is, therefore, information relevant to the analysis of the primary source code files 134. In general, resolving the set of secondary source code files 136 is language dependent, and a number of levels of dependencies to consider when generating the set of secondary source code files 136 may be based on a type of application requesting the analysis results 104, one or more specified parameters, and other suitable factors.

The analysis engine 122 performs the partial analysis using files included in the set of primary source code files 134 and the set of secondary source code files 136 to generate the analysis results 104. The analysis engine 122 then provides the analysis results 104 relating to the set of primary source code files 134 back to the user device 100 for presentation to a user, possibly through use of the coding tool plugin 112.

Figure 2:
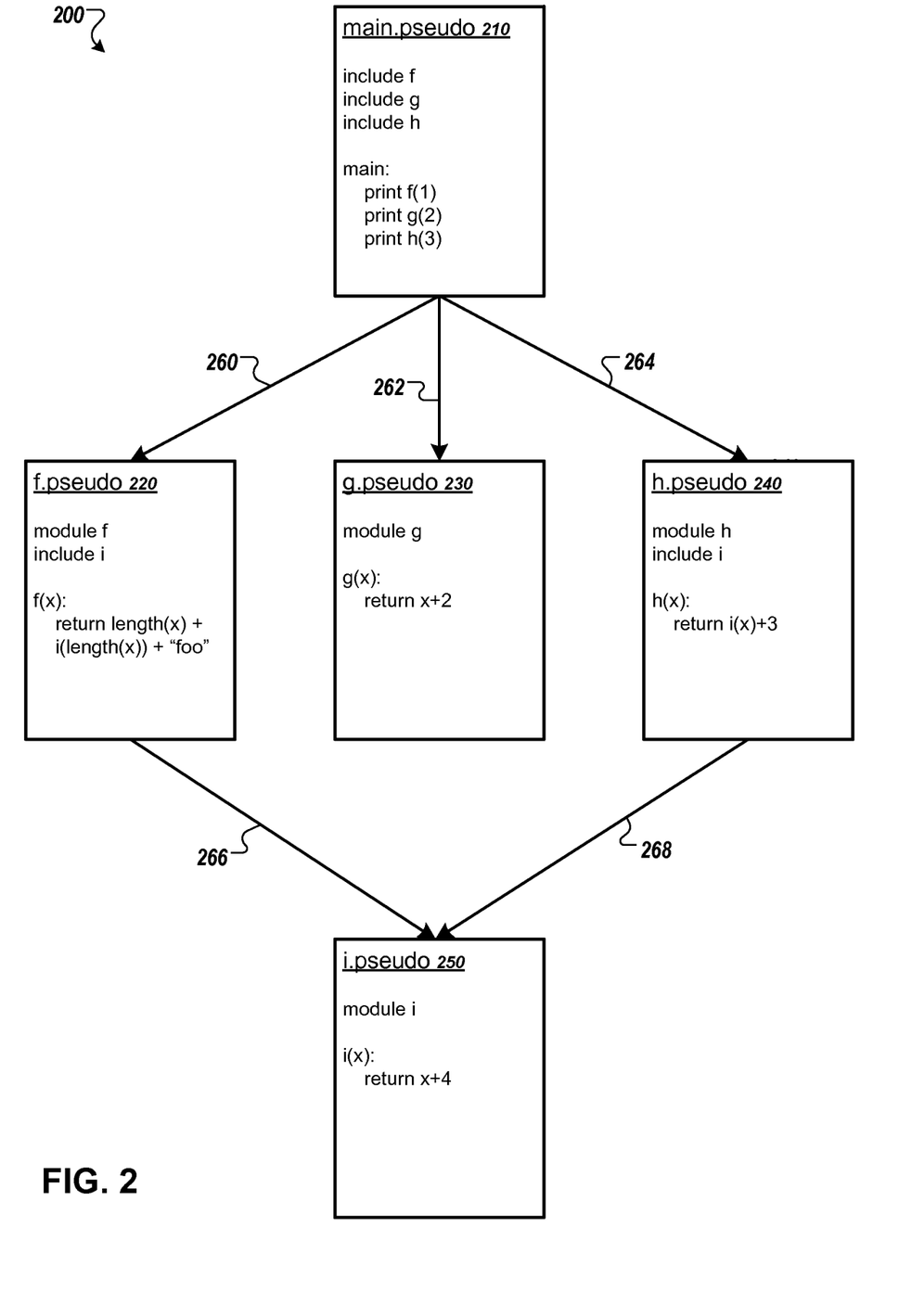
FIG. 2 illustrates an example dependency graph.

FIG. 2 illustrates an example dependency graph 200. In general, a dependency graph, which may also be referred to as an include graph or import graph, is a directed graph that represents dependencies between project source code elements, such as files, modules, or objects of a project.

Generally, a first source code file depends on a second source code file if the second source code file includes a definition of a source code element used by the first source code file. The form that a dependency takes generally depends on the particular programming language of the source code file. For example, in the C programming language, a file may include other files using preprocessor directives, e.g., "#include," and thus may depend on the files it includes. As another example, in the Python programming language, a file may use the "import" command to import other files, and thus may depend on the files it imports. As a third example, in the Java programming language a file may use classes defined in a second file (whether they are stated in an "import" statement or referred to by their fully-qualified name), and thus may depend on the second file. Thus, the types of dependencies that are represented by the links in the dependency graph can include more than mere include and import directives. As the Java example illustrates, the dependency information may be obtained from source code anywhere in a source code file and not merely from import statements near the top.

The dependency graph 200 is an example of a visual representation of data representing a directed dependency graph that may be used by a static analysis system, e.g., the static analysis system 110 of FIG. 1. The system can use the dependency graph 200 to generate a set of primary source code files and a set of secondary source code files to be considered for performing a partial analysis. However, the system need not actually display a visual representation of the dependency graph 200.

Using a dependency graph that has been generated for source code files of a code base, for example, the static analysis system 110 can identify files that depend on a particular primary source code file under evaluation, and can identify files on which the particular primary source code file depends. The dependency graph may be generated as part of a process for generating sets of source code files for analysis, for example, or may be generated and stored, e.g., when source code files are modified, and may be accessed by the process for generating sets of source code files when the static analysis system 110 receives a request for analysis results.

Referring to the example dependency graph 200, for example, a source code file 210, e.g., "main.pseudo" may be under evaluation as a primary source code file. For example, the source code file 210 may be displayed by an interface of an IDE, may be included in a change list maintained by a code review tool, or may have changed between code base revisions and considered by a historical analysis process. In the present example, the primary source code file 210, e.g., "main.pseudo" is shown with a link 260, e.g., a directed arrow, from the file 210 to a source code file 220, e.g., "f.pseudo," which shows that the source code file 210 depends on the source code file 220. Similarly, the primary source code file 210 is shown with a link 262 from the file 210 to a source code file 230, e.g., "g.psuedo," and a link 264 from the file 210 to a source code file 240, e.g., "h.pseudo," which shows that the source code file 210 also depends on the source code files 230 and 240. Thus, in the present example, each of the files 220, 230 and 240 may be identified as secondary source code files to be included in a static analysis of the primary source code file 210.

Source code files that have one or more steps in a dependency graph from a primary file may be identified as secondary source code files. In general, a number of steps from a primary file to a secondary file corresponds to a maximum number of links directed from the primary file to the secondary file. For example, each of the source code files 220, 230 and 240 have one step from the source code file 210 that is, single respective links 260, 262 and 264 exist from the source code file 210 to each of the respective source code files 220, 230 and 240. Thus, in the present example, if the source code file 210 is considered as a primary source code file, each of the source code files 220, 230 and 240 may be identified as secondary source code files, one step from the primary source code file 210. As shown in the example dependency graph 200, a file 250, e.g., "i.pseudo" is shown with a link 266 from the source code file 220 and a link 268 from the source code file 240. Thus, in the present example, if the source code file 210 is considered as a primary source code file, the source code file 250 may be identified as a secondary source code file, two steps from the primary source code file 210.

Example pseudocode for each of the source code files 210 ("main.pseudo"), 220 ("f.pseudo"), 230 ("g.pseudo"), 240 ("h.pseudo"), and 250 ("i.pseudo") is as follows:

File main.pseudo:
include f
include g
include h

```
main:
print f(1)
print g(2)
print h(3)
File f.pseudo (modified):
module f
include i
f(x):
return length(x)+i(length(x))+"foo"
File g.pseudo (modified):
module g
g(x):
return x+2
File h.pseudo:
module h
include i
h(x):
return i(x)+3
File i.pseudo:
module i
i(x):
return x+4
```

As shown by the example pseudocode above, the source code file 220 ("f.pseudo") has been modified and now includes a violation, e.g., attempting to add a string to an integer. Although the source code file 210 ("main.pseudo") has not been modified, it now also includes a violation due to its dependency on "f.pseudo," e.g., passing "module f" defined in "f.pseudo" an integer when "module f" expects a string. Considering the source code file 210 as a primary source code file, if the file 210 were to be evaluated in isolation, its violation would not be determined. However, by identifying a set of secondary source code files on which the primary source code file 210 depends, e.g., the source code files 220, 230, 240, and optionally 250, and evaluating the primary and secondary source code files together, the violation included in the source code file 210 may be determined, and information associated with the violation may be provided.

Figure 3:
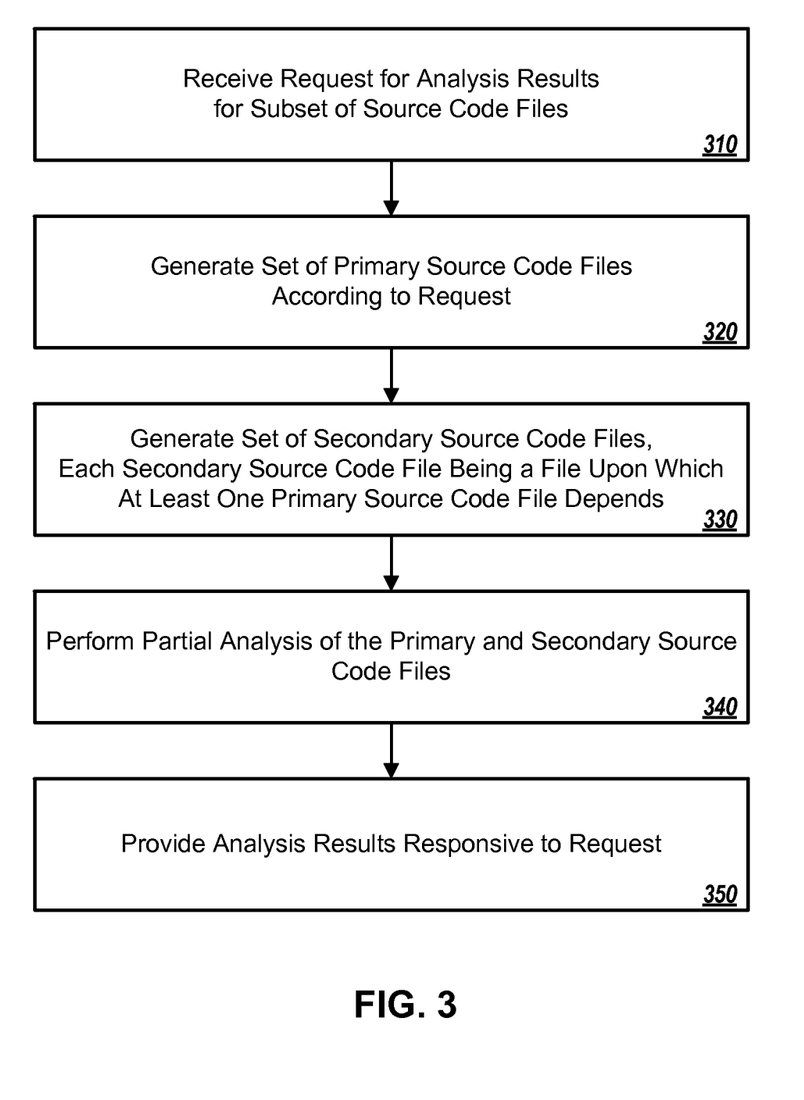
FIG. 3 is a flow chart of an example process for generating sets of source code files for analysis.

FIG. 3 is a flow chart of an example process for generating sets of source code files for analysis. The process can be performed by a static analysis system, e.g., the static analysis system 110, shown in FIG. 1. The process will be described as being performed by an appropriately programmed system of one or more computers.

The system receives a request for analysis results for a subset of source code files in a project (310). Referring to FIG. 1, for example, the static analysis system 110 can receive a request 102 for analysis results from various coding tools and environments, using the coding tool plugin 112.

The request for analysis results may request analysis results for one or more source code files currently being presented in an IDE. The developer may want to quickly obtain analysis results for one or more files currently being presented, rather than obtaining analysis results for the entire code base.

The request for analysis results may also request analysis results for one or more source code files that are the subject of a code review. For example, the files may be files that have changed since a last revision of the project. The developer may want to quickly obtain analysis results for one or more source code files under review, e.g., files included in a change list, rather than performing a full analysis of the entire code base.

The request for analysis results may also request historical analysis results between two snapshots of the project. A developer can select two snapshots for analysis, and the developer can request analysis results that represent violations introduced and removed between the files that changed.

The system generates a set of primary source code files according to the request (320). The set of primary source code files generally includes fewer than all the source code files in the project. For example, a set of primary source code files corresponding to a request for analysis results for an IDE can be the one or more source code files currently being presented by the IDE. As another example, a set of primary source code files corresponding to a request for analysis results for a code review environment can be the one or more source code files that have changed since a last revision of a project. In the context of historical analysis, the system can select, as the set of primary source code files, files that changed between two snapshots in the code base.

The system may also supplement the set of primary files with additional files according to a dependency graph. This will be described in more detail below with reference to FIG. 4.

The system generates a set of secondary source code files (330). Each secondary source code file 136, for example, is a source code file upon which at least one of the primary source code files 134 depends, either directly or transitively through one or more steps in a dependency graph the graph.

For example, the system can obtain data representing a dependency graph of the source code files included in the code base. The system typically generates the dependency graph prior to receipt of the request for analysis results. The dependency graph includes a link from one node representing a first source code file to another node representing a second source code file when the first source code file depends on the second source code file. Referring to the dependency graph 200 of FIG. 2, for example, the link 260 between the source code file node 210 to the source code file node 220, indicates that a first source code file represented by source code file node 210 depends on a second source code file represented by the second source code file node 220.

Generating the set of secondary source code files can include identifying all source code files having a path of a specified maximum length in the dependency graph from at least one of the primary source code files. Referring to the example dependency graph 200 of FIG. 2, for example, if the source code file 220 ("f.pseudo") and the source code file 230 ("g.pseudo") are each considered to be primary source code files, the source code file 250 ("i.pseudo") having the link 266 from the source code file 220 would be identified as being a secondary source code file if the specified maximum path length was greater than zero.

The primary files may depend transitively on some of the secondary source code files rather than directly. In other words, a secondary file need not be located only one step away from a primary file. Rather, a source code file may be considered a secondary source code file whenever a path in the graph of a particular maximum length or less exists between respective nodes representing the source code file and a primary source code file.

The system performs a partial analysis of the primary and secondary source code files (340). Referring again to the example dependency graph 200 of FIG. 2, for example, if the source code file 220 ("f.pseudo") and the source code file 230 ("g.pseudo") are each considered to be primary source code files, and the source code file 250 ("i.pseudo") is identified as being a secondary source code file, the system can generate analysis results using source code of all three of the source code files 220, 230 and 250.

The system provides the analysis results in response to the request (350). For example, the system can provide the analysis results using a coding tool plugin. In some implementations, the system can present the generated analysis results by an interface of a coding tool. For example, the generated analysis results may be presented at a user device within an IDE, a code review environment, a historical analysis environment, or another suitable coding tool interface.

Referring again to the example dependency graph 200 of FIG. 2, for example, if the source code file 220 ("f.pseudo") and the source code file 230 ("g.pseudo") are each considered to be primary source code files, and the source code file 250 ("i.pseudo") is identified as being a secondary source code file, the analysis results to be presented at the user device will include analysis results for the primary source code files 220 and 230, but not analysis results for the secondary source code file 250.

Figure 4:
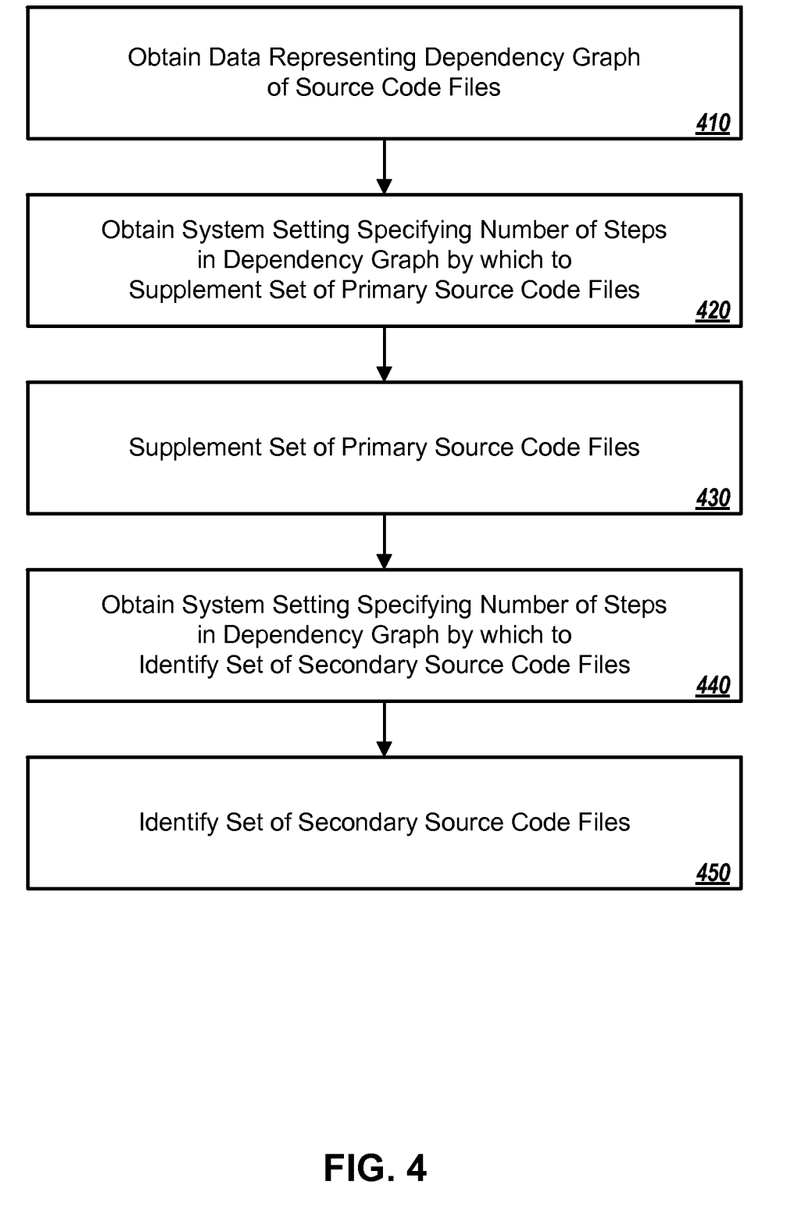
FIG. 4 is a flow chart of an example process for using a dependency graph to generate sets of source code files for analysis.

FIG. 4 is a flow chart of an example process for using a dependency graph to generate sets of source code files for analysis. The process can be performed by a static analysis system, e.g., the static analysis system 110, shown in FIG. 1. The process will be described as being performed by an appropriately programmed system of one or more computers.

The system obtains data representing a dependency graph of source code files in a project (410). The dependency graph includes a link from a first source code file to a second source code file whenever the first source code file depends on the second source code file. Referring to the dependency graph 200 of FIG. 2, for example, the link 266, e.g., a directed arrow from the source code file 220 to the source code file 250, indicates that the source code file 220 depends on the source code file 250.

The system obtains a system setting specifying a first number of steps in the dependency graph by which to supplement a set of primary source code files (420). The first number of steps represents a maximum path length that can exist between files in an initial set of primary source code files and files that will supplement the primary source code files. The first number of steps can be zero or nonzero. If the first number of steps is zero, the system effectively does not supplement the initial set of primary source code files.

For example, the static analysis system 110 can include a configuration setting specifying the first number of steps. The system can then include, in a set of primary source code files, any source code files from which at least one of the initial primary source files is reachable along a path in the dependency graph no longer than the first number of steps. In this context, a number of steps N "up" in a dependency graph from a primary source code file means along a path going against the direction of the links from an initial primary source code file to a supplemental primary source code file.

Referring to the example dependency graph 200 of FIG. 2, if the source code file 250, e.g., "i.pseudo" were to be considered as a primary file, the source code file 220, e.g., "f.pseudo" having the link 266 from the file 220 to the file 250 is one step "up" in the dependency graph from the file 250. Therefore, the file 250 can be considered a supplemental primary file if the number of steps is one or greater.

Similarly, in the present example, the source code file 240, e.g., "h.pseudo" having the link 268 from the file 240 to the file 250 is one step up in the dependency graph from the file 250, and thus may also be considered as a supplemental primary file. The source code file 210, e.g., "main.pseudo" is two steps up the graph from the file 250. Thus, the source code file 210 is only to be considered a supplemental primary source code file if the first number of steps in the dependency graph is greater than one.

In some implementations, the system generates a system setting specifying a first number of steps in the dependency graph by which to supplement the set of primary source code files based on a programming language of the project. For example, the static analysis system 110 can include default system settings for each of a set of programming languages, in which the default system settings specify the number of steps by which to supplement source code files that have been generated using the respective programming language. Based on characteristics and rules of a programming language, it may or may not be generally appropriate to supplement the set of primary source code files. For source code files created using the C programming language, for example, an initial approximation of primary source code files may not be supplemented with additional primary source code files. For source code files created using the Python programming language, for example, an initial approximation of primary source code files may be supplemented with additional primary source code files that are one step up from the files included in the initial approximation. In general, default system settings may be provided, based at least in part on characteristics and rules of the programming languages, and based at least in part on tradeoffs between time and system resources required for producing analysis results and an expected level of accuracy of the results.

In some implementations, the system generates a system setting specifying a first number of steps in a dependency graph by which to supplement the set of primary source code files based on an application type of the request. For example, the static analysis system 110 can receive information related to a coding tool or environment that provides the request 102 for analysis results. The system can then supplement the set of primary source code files 134 as appropriate for the tool or environment. The application type of the request may be a request for a code review, a request for historical analysis, a request for analysis within an IDE, or a request from another coding tool or environment. The number of steps in the dependency graph by which to supplement the set of primary source code files for a historical analysis tool can be one step. When using a historical analysis tool, for example, a developer may be interested in identifying violations that occur in source code files that depend on modified files, in addition to identifying violations that occur in the modified files. The number of steps in the dependency graph by which to supplement the set of primary source code files for a request for a code review or a request for analysis within an IDE can be zero steps. When using a code review tool or an IDE, for example, a developer may be interested in identifying violations that may occur in source code files currently being displayed. Optionally, the number of steps for a request for code review or a request for analysis within an IDE may be more than zero steps. For example, an interface of a code review tool or IDE may provide a display area for presenting information related to violations that may occur in source code files on which the currently displayed source code files depend, and analysis results 104 pertaining to such violations can be generated and provided by the analysis system 110.

In some implementations, the system receives, from a user, input specifying a first number of steps in the dependency graph by which to supplement the set of primary source code files. For example, a developer can employ the user device 100 to provide input to the static analysis system 110 specifying a number of steps by which to supplement an initial approximation of primary source code files. If a user is willing to commit more system resources to performing static analysis of an expanded portion of a code base and is willing to potentially receive the analysis results 104 in more time, for example, the user may increase the number of steps for supplementing primary source code files, potentially increasing the amount and accuracy of analysis results provided by the static analysis system 110. If a user prefers to commit fewer system resources to performing static analysis of a reduced portion of a code base and to potentially receive the analysis results 104 in less time, for example, the user may decrease the number of steps for supplementing primary source code files, potentially decreasing the amount and accuracy of analysis results provided by the static analysis system 110.

The system supplements the set of primary source code files (430). To supplement the set of primary source code files 134 by one step, for example, the static analysis system 110 can identify all source code files having a link in the dependency graph to at least one of the primary source code files and can add the identified source code files to the set of primary source code files. Supplementing the set of primary source code files may include identifying all source code files from which any of the primary files are reachable in the dependency graph by a path of length at most the first number of steps and adding the identified source code files to the set of primary source code files. For example, the request 102 for analysis results for the subset of source code files in the project may be a request for historical analysis results that attribute source code violations introduced and source code violations removed in one or more source code files changed since a last revision of the project. In the present example, by supplementing the set of source code files that have changed with all source code files that are one or more steps up in a dependency graph, i.e., one or more source code files that depend on the files that have changed, the accuracy of historical analysis results data may be improved.

As mentioned above, the system need not supplement the set of primary source code file. In particular, if the first number of steps is zero, the system does not supplement the primary source code files.

The system can consider other factors as well when considering whether to supplement an initial set of primary source code files with one or more other source code files. In particular, the system can consider file ownership, access permissions, or other metadata of the source code files when determining when to include a file in the set of primary source code file. This can be used, for example, to suppress analysis results for files that a developer is not responsible for. For example, If a developer does not have permission to edit or access a source code file, or if metadata associated with the source code file indicates that the developer is not responsible for the source code file, the system can omit the particular source code file from the set of primary source code files.

In addition, the system can omit automatically generated source code files from the set of primary source code files. In other words, even if the dependency graph indicates that a computer-generated source code file is reachable by the first number of steps from another primary source code file, the system can still decline to include the file in the set of primary source code files. This is because static analysis results of computer-generated code is likely to be voluminous or uninteresting.

The system obtains a second system setting specifying a second number of steps in the dependency graph by which to identify the set of secondary source code files (440). The second number of steps represents a maximum path length that can exist between files in the set of primary source code files and the secondary source code files. The second number of steps can be zero or nonzero. If the second number of steps is zero, the system does not identify any secondary source code files.

For example, the static analysis system 110 can include a configuration setting specifying the second number of steps. The system can then include, in the set of secondary source code files, any source code files that are reachable from one of the primary source code files along a path of length no longer than the second number of steps. In this context, a number of steps N "down" in the dependency graph from a primary source code file means along a path going with the direction of the links from a primary source code file to a secondary source code file.

Referring to the example dependency graph 200 of FIG. 2, if the source code file 210, e.g., "main.pseudo" were to be considered as a primary file, each of the source code files 220, e.g., "f.pseudo," 230, e.g., "g.pseudo," and 240, "h.pseudo," having the respective links 260, 262, and 264, are one step down in the dependency graph from the file 210, and thus may be considered as secondary files if the second number of steps in the dependency graph is greater than zero. The source code file 250, e.g., "i.pseudo" having a chain of two links 260 and 266, and having a chain of two links 264 and 268, from the file 210 to the file 250, is two steps down in the dependency graph from the file 210, and thus is only considered a secondary file if the second number of steps in the dependency graph is greater than one.

In some implementations, the system generates a system setting specifying a second number of steps in the dependency graph by which to identify the set of secondary source code files based on a programming language of the project. For example, the static analysis system 110 can include default system settings for each of a set of programming languages, in which the default system settings specify the number of steps by which to identify source code files that have been generated using the respective programming language. Based on characteristics and rules of a programming language, for example, a number of steps in a dependency graph by which to identify the set of secondary source code files may vary. For source code files created using the C programming language, for example, an unlimited number of steps down may be taken to identify the set of secondary source code files that is, all dependencies may be considered, since a header file may include other header files, and each of those may be relevant to the set of primary source code files 134. In other words, the system goes all the way down the graph when selecting secondary source code files. For source code files created using the Python programming language, for example, the set of secondary source code files may include source code files that are one step down from files included in the set of primary source code files. In general, default system settings may be provided, based at least in part on characteristics and rules of the programming languages, and based at least in part on a determined compromise between time and system resources committed for producing analysis results, and a desired accuracy of the data.

In some implementations, the system generates a system setting specifying a second number of steps in the dependency graph by which to identify the set of secondary source code files based on an application type of the request. For example, the static analysis system 110 can receive information related to a coding tool or environment that provides the request 102 for analysis results, and can identify the set of secondary source code files as appropriate for the tool or environment. The application type of the request may be a request for a code review application, a request for historical analysis, a request for analysis within an IDE, or a request from another coding tool or environment.

In some implementations, the system receives, from a user, input specifying a second number of steps in the dependency graph by which to identify the set of secondary source code files. For example, a developer can employ the user device 100 to provide input to the static analysis system 110 specifying a desired number of steps from the primary source code files 134 by which to identify the secondary source code files 136. If a user is willing to commit more system resources to performing static analysis of an expanded portion of a code base and is willing to potentially receive the analysis results 104 in more time, for example, the user may increase the number of steps for identifying secondary source code files, potentially increasing the amount and accuracy of analysis results provided by the static analysis system 110. If a user prefers to commit fewer system resources to performing static analysis of a reduced portion of the code base and to potentially receive the analysis results 104 in less time, for example, the user may decrease the number of steps for identifying secondary source code files, potentially decreasing the amount and accuracy of analysis results provided by the static analysis system 110.

The system identifies the set of secondary source code files (450). To identify the set of secondary source code files 136, for example, the system identifies all source code files reachable from any of the primary files by a path of length at most the second number of steps. The system then adds the identified source code files to the set of secondary source code files.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments of the attached embodiments and the embodiments described above, the following embodiments are also innovative:

Embodiment 1 is a method comprising:

receiving a request for analysis results for a subset of source code files in a project;

generating a set of primary source code files according to the request, wherein the set of primary source code files includes fewer than all source code files in the project;

generating a set of secondary source code files comprising source code files upon which at least one of the primary source code files depends directly or transitively;

performing a partial analysis of the code base using all files included in the set of primary source code files or the set of secondary source code files; and providing analysis results for the files included in the set of primary source code files in response to the request.

Embodiment 2 is the method of embodiment 1, further comprising:

obtaining data representing a dependency graph of source code files in the project, wherein the dependency graph has a link from a first source code file to a second source code file whenever the first source code file depends on the second source code file, and wherein generating the set of secondary source code files comprises identifying all source code files reachable along a path of at most N steps in the dependency graph from at least one of the primary source code files.

Embodiment 3 is the method of any one of embodiments 1-2, wherein generating the set of secondary source code files comprises identifying a set of source code files upon which at least one file in the set of primary source code files depends transitively.

Embodiment 4 is the method of any one of embodiments 1-3, further comprising:

obtaining a system setting specifying a number of steps in the dependency graph by which to identify the set of secondary source code files;

identifying the set of secondary source code files including identifying all source code files reachable along a path having at most the number of steps in the dependency graph from at least one of the primary source code files; and adding the identified source code files to the set of secondary source code files.

Embodiment 5 is the method of embodiment 4, further comprising:

generating the system setting specifying the number of steps in the dependency graph by which to identify the set of secondary source code files based on a programming language of the project.

Embodiment 6 is the method of embodiment 5, further comprising:

determining that the programming language requires an unlimited number of steps for the number of steps; and modifying the system setting for the number of steps to be an unlimited number of steps.

Embodiment 7 is the method of embodiment 4, further comprising:

generating the system setting specifying the number of steps in the dependency graph by which to identify the set of secondary source code files based on an application type of the request.

Embodiment 8 is the method of embodiment 7, wherein the application type of the request is a request for a code review application, a request for historical analysis, or a request for analysis within an integrated development environment.

Embodiment 9 is the method of embodiment 4, further comprising:

receiving, from a user, input specifying the number of steps in the dependency graph by which to identify the set of secondary source code files.

Embodiment 10 is the method of any one of embodiments 1-9, further comprising:

supplementing the set of primary source code files including identifying all source code files from which at least one of the primary source code files are reachable along a path of at most N steps; and adding the identified source code files to the set of primary source code files.

Embodiment 11 is the method of any one of embodiments 1-10, further comprising:

obtaining a system setting specifying a number of steps in the dependency graph by which to supplement the set of primary source code files; and supplementing the set of primary source code files including identifying all source code files from which at least one of the primary source code files are reachable along a path having a length that is no more than the number of steps; and adding the identified source code files to the set of primary source code files.

Embodiment 12 is the method of embodiment 11, further comprising:

generating the system setting specifying the number of steps in the dependency graph by which to supplement the set of primary source code files based on a programming language of the project.

Embodiment 13 is the method of embodiment 11, further comprising:

generating the system setting specifying the number of steps in the dependency graph by which to supplement the set of primary source code files based on an application type of the request.

Embodiment 14 is the method of embodiment 13, wherein the application type of the request is a request for a code review, a request for historical analysis, or a request for analysis within an integrated development environment.

Embodiment 15 is the method of any one of embodiments 13-14, further comprising:

determining that the application type of the request is a request for historical analysis; and in response to the determining, modifying the system setting for the number of steps to be one step.

Embodiment 16 is the method of any one of embodiments 13-14, further comprising:

determining that the application type of the request is a request for a code review or a request for analysis within the integrated development environment; and in response to the determining, modifying the system setting for the number of steps to be zero steps.

Embodiment 17 is the method of embodiment 11, further comprising:

receiving, from a user, input specifying the number of steps in the dependency graph by which to supplement the set of primary source code files; and modifying the system setting for the number of steps according to the input received from the user.

Embodiment 18 is the method of any one of embodiments 1-15 and 17, wherein the request for analysis results for the subset of source code files in the project is a request for historical analysis results that attribute source code violations introduced and source code violations removed in one or more source code files changed since a last revision of the project.

Embodiment 19 is the method of any one of embodiments 1-18, wherein the request for analysis results for the subset of source code files in the project is a request for analysis results for one or more source code files changed since a last revision of the project.

Embodiment 20 is the method of any one of embodiments 1-19, wherein the request for analysis results for the subset of source code files in the project is a request for analysis results for one or more source code files currently being presented in an integrated development environment.

Embodiment 21 is the method of embodiment 20, further comprising:

presenting the generated analysis results within the integrated development environment.

Embodiment 22 is a system comprising: one or more computers and one or more storage devices storing instructions that are operable, when executed by the one or more computers, to cause the one or more computers to perform the method of any one of embodiments 1 to 21.

Embodiment 23 is a computer storage medium encoded with a computer program, the program comprising instructions that are operable, when executed by data processing apparatus, to cause the data processing apparatus to perform the method of any one of embodiments 1 to 21.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving, from a user, a request for partial analysis results to identify source code violations introduced by the user in changes made by the user to one or more source code files in a first snapshot of a project;

generating an initial set of primary source code files comprising only one or more source code files changed by the user relative to source code files in the first snapshot of the project;

obtaining data representing a dependency graph of source code files in the project, wherein the dependency graph has a directed link from a first node representing a first source code file to a second node representing a second source code file whenever the first source code file imports the second source code file or uses one or more definitions in the second source code file;

generating an augmented set of primary source code files, including adding, to the initial set of primary source code files, one or more additional source code files represented by nodes in the dependency graph having a link to any node representing any of the files in the initial set of primary source code files;

generating a set of secondary source code files including identifying source code files represented by nodes to which a link in the dependency graph exists from any node representing any of the files in the augmented set of primary source code files;

performing a partial analysis of the project using done or more files included in the augmented set of primary source code files and the set of secondary source code files to identify unmatched violations occurring in the augmented set of primary source code files but not occurring in the first snapshot, the unmatched violations being violations introduced by the user in changes made by the user to the one or more source code files in the initial set of primary source code files; and providing partial analysis results for the files included in the augmented set of primary source code files, wherein the partial analysis results identify locations of the violations introduced by the user in the one or more source code files.

2. The method of claim 1,
wherein generating the set of secondary source code files comprises identifying all source code files reachable along a path of at most N steps in the dependency graph from at least one of the source code files in the augmented set of primary source code files.

3. The method of claim 1, wherein a change made by the user to one of the source code files in the initial set of primary source code files introduced a violation in a first source code file in the augmented set of primary source code files, and wherein performing the partial analysis comprises determining that the violation in the first source code file is an unmatched violation that does not occur in the first snapshot of the project.

4. The method of claim 2, further comprising:
obtaining a system setting specifying a value for N representing a maximum number of steps in the dependency graph by which to identify the set of secondary source code files;
identifying the set of secondary source code files including identifying all source code files reachable along a path having at most N steps in the dependency graph from at least one of the files in the augmented set of primary source code files; and
adding the identified source code files to the set of secondary source code files.

5. The method of claim 4, further comprising:
identifying a programming language of the project; and
obtaining a programming-language-specific setting for the value of N for the identified programming language of the project.

6. The method of claim 5, further comprising:
determining that the programming-language-specific setting is an unlimited number of steps; and
in response, adding, to the set of secondary source code files, all files represented by nodes that are reachable in the dependency graph from any nodes representing files in the augmented set of primary source code files.

7. The method of claim 4, further comprising:
obtaining an application-specific setting for the value of N based on an application type of the request.

8. The method of claim 1, wherein generating the augmented set of primary source code files comprises identifying all source code files from which at least one of the primary source code files are reachable along a path of at most N steps in the dependency graph; and
adding the identified source code files to the augmented set of primary source code files.

9. The method of claim 8, further comprising:
obtaining a system setting specifying a number of steps in a dependency graph of source code files in the project by which to supplement the initial set of primary source code files, wherein generating the augmented set of primary source code files comprises identifying all source code files from which at least one of the primary source code files are reachable along a path having a length that is no more than N steps; and
adding the identified source code files to the augmented set of primary source code files.

10. The method of claim 9, further comprising:
identifying a programming language of the project; and
obtaining a programming-language-specific setting for a value of N for the identified programming language.

11. The method of claim 9, further comprising:
obtaining an application-specific setting for the value of N based on an application type of the request.

12. The method of claim 1, wherein the first snapshot is a most recent revision of the project.

13. The method of claim 1, wherein generating the initial set of primary source code files comprises adding to the initial set of primary source code files all source code files that have been changed by the user relative to the first snapshot of the project.

14. The method of claim 1, wherein generating the initial set of primary source code files comprises adding to the initial set of primary source code files one or more source code files currently being presented in an integrated development environment.

15. A system comprising:
one or more computers and one or more storage devices storing instructions that are operable, when executed by the one or more computers, to cause the one or more computers to perform operations comprising:
receiving, from a user, a request for partial analysis results to identify source code violations introduced by the user in changes made by the user to one or more source code files in a first snapshot of a project;
generating an initial set of primary source code files comprising only one or more source code files changed by the user relative to source code files in the first snapshot of the project;
obtaining data representing a dependency graph of source code files in the project, wherein the dependency graph has a directed link from a first node representing a first source code file to a second node representing a second source code file whenever the first source code file imports the second source code file or uses one or more definitions in the second source code file;
generating an augmented set of primary source code file, including adding, to the initial set of primary source code files, one or more additional source code files represented by nodes in the dependency graph having a link to any node representing any of the files in the initial set of primary source code files;
generating a set of secondary source code files including identifying source code files represented by nodes to which a link in the dependency graph exists from any node representing any of the files in the augmented set of primary source code files;

performing a partial analysis of the project using one or more files included in the augmented set of primary source code files and the set of secondary source code files to identify unmatched violations occurring in the augmented set of primary source code files but not occurring in the first snapshot, the unmatched violations being violations introduced by the user in changes made by the user to the one or more source code files in the initial set of primary source code files; and providing partial analysis results for the files included in the augmented set of primary source code files, wherein the partial analysis results identify locations of the violations introduced by the user in the one or more source code files.

16. The system of claim 15, wherein generating the set of secondary source code files comprises identifying all source code files reachable along a path of at most N steps in the dependency graph from at least one of the source code files in the augmented set of primary source code files.

17. The system of claim 15, wherein a change made by the user to one of the source code files in the initial set of primary source code files introduced a violation in a first source code file in the augmented set of primary source code files, and wherein performing the partial analysis comprises determining that the violation in the first source code file is an unmatched violation that does not occur in the first snapshot of the project.

18. The system of claim 16, wherein the operations further comprise:

obtaining a system setting specifying a value for N representing a maximum number of steps in the dependency graph by which to identify the set of secondary source code files;

identifying the set of secondary source code files including identifying all source code files reachable along a path having at most N steps in the dependency graph from at least one of the files in the augmented set of primary source code files; and adding the identified source code files to the set of secondary source code files.

19. The system of claim 18, wherein the operations further comprise:

identifying a programming language of the project; and obtaining a programming-language-specific setting for the value of N for the identified programming language of the project.

20. The system of claim 19, wherein the operations further comprise:

determining that the programming-language-specific setting is an unlimited number of steps; and in response, adding, to the set of secondary source code files, all files represented by nodes that are reachable in the dependency graph from any nodes representing files in the augmented set of primary source code files.

21. The system of claim 18, wherein the operations further comprise:

obtaining an application-specific setting for the value of N based on an application type of the request.

22. The system of claim 15, wherein generating the augmented set of primary source code files comprises identifying all source code files from which at least one of the primary source code files are reachable along a path of at most N steps in the dependency graph; and adding the identified source code files to the augmented set of primary source code files.

23. The system of claim 22, wherein the operations further comprise:

obtaining a system setting specifying a number of steps in a dependency graph of source code files in the project by which to supplement the initial set of primary source code files, wherein generating the augmented set of primary source code files comprises identifying all source code files from which at least one of the primary source code files are reachable along a path having a length that is no more than N steps; and adding the identified source code files to the augmented set of primary source code files.

24. The system of claim 23, wherein the operations further comprise:

identifying a programming language of the project; and obtaining a programming-language-specific setting for a value of N for the identified programming language.

25. The system of claim 23, wherein the operations further comprise:

obtaining an application-specific setting for the value of N based on an application type of the request.

26. The system of claim 15, wherein the first snapshot is a most recent revision of the project.

27. The system of claim 15, wherein generating the initial set of primary source code files comprises adding to the initial set of primary source code files all source code files that have been changed by the user relative to the first snapshot of the project.

28. The system of claim 15, wherein generating the initial set of primary source code files comprises adding to the initial set of primary source code files one or more source code files currently being presented in an integrated development environment.

29. A computer program product, encoded on one or more computer-readable hardware storage devices, comprising instructions that when executed by one or more computers cause the one or more computers to perform operations comprising:

receiving, from a user, a request for partial analysis results to identify source code violations introduced by the user in changes made by the user to one or more source code files in a first snapshot of a project;

generating an initial set of primary source code files comprising only one or more source code files changed by the user relative to source code files in the first snapshot of the project;

obtaining data representing a dependency graph of source code files in the project, wherein the dependency graph has a directed link from a first node representing a first source code file to a second node representing a second source code file whenever the first source code file imports the second source code file or uses one or more definitions in the second source code file;

generating an augmented set of primary source code file, including adding, to the initial set of primary source code files, one or more additional source code files represented by nodes in the dependency graph having a link to any node representing any of the files in the initial set of primary source code files;

generating a set of secondary source code files including identifying source code files represented by nodes to which a link in the dependency graph exists from any node representing any of the files in the augmented set of primary source code files;

performing a partial analysis of the project using all one or more files included in the augmented set of primary source code files and the set of secondary source code files to identify unmatched violations occurring in the augmented set of primary source code files but not occurring in the first snapshot, the unmatched violations being violations introduced by the user in changes made by the user to the one or more source code files in the initial set of primary source code files; and providing partial analysis results for the files included in the augmented set of primary source code files, wherein the partial analysis results identify locations of the violations introduced by the user in the one or more source code files.

* * * * *